United States Patent
Wang et al.

(10) Patent No.: US 12,454,608 B2
(45) Date of Patent: Oct. 28, 2025

(54) GREEN ENVIRONMENTALLY FRIENDLY ADHESIVE DIPPING LIQUID AND METHOD FOR PRODUCTION THEREOF

(71) Applicant: WILLING NEW MATERIALS TECHNOLOGY CO., LTD., Henan (CN)

(72) Inventors: Zhiqiang Wang, Henan (CN); Guangfeng Jiang, Henan (CN); Jianping Zhao, Henan (CN); Yidonglin Liu, Henan (CN); Fei Wang, Henan (CN)

(73) Assignee: WILLING NEW MATERIALS TECHNOLOGY CO., LTD., Henan (CN)

( * ) Notice: Subject to any disclaimer, the term of this patent is extended or adjusted under 35 U.S.C. 154(b) by 939 days.

(21) Appl. No.: 17/597,369

(22) PCT Filed: Jul. 2, 2020

(86) PCT No.: PCT/CN2020/099960
§ 371 (c)(1),
(2) Date: Jan. 4, 2022

(87) PCT Pub. No.: WO2021/004369
PCT Pub. Date: Jan. 14, 2021

(65) Prior Publication Data
US 2022/0235210 A1    Jul. 28, 2022

(30) Foreign Application Priority Data

Jul. 6, 2019   (CN) .......................... 201910607037.3

(51) Int. Cl.
*C08L 9/08* (2006.01)
*C08J 5/24* (2006.01)
(Continued)

(52) U.S. Cl.
CPC ................. *C08L 9/08* (2013.01); *C08J 5/246* (2021.05); *C08J 5/249* (2021.05); *D06M 11/72* (2013.01);
(Continued)

(58) Field of Classification Search
CPC .... C08L 9/08; C08L 9/10; C08L 13/02; C08J 2309/08; C08J 2309/10; C08J 2313/02;
(Continued)

(56) References Cited

U.S. PATENT DOCUMENTS

| | | | | |
|---|---|---|---|---|
| 3,682,969 A | * | 8/1972 | Batzer | .................... C08G 59/24 |
| | | | | 549/333 |
| 2012/0041113 A1 | * | 2/2012 | Ikeda | ........................ C08L 9/08 |
| | | | | 524/114 |
| 2020/0010741 A1 | * | 1/2020 | Jeon | ........................ C09J 175/04 |

FOREIGN PATENT DOCUMENTS

| | | |
|---|---|---|
| CN | 102414362 A | 4/2012 |
| CN | 106084362 A | 11/2016 |

(Continued)

OTHER PUBLICATIONS

Machine translation of JP-2004027158-A obtained from IP.com (Year: 2004).*

(Continued)

Primary Examiner — Arrie L Reuther
Assistant Examiner — David R. Foss
(74) Attorney, Agent, or Firm — HAUPTMAN HAM, LLP

(57) ABSTRACT

An environment-friendly impregnation solution includes in percentage by weight: 1-15% of blocked isocyanate, 0.5-10% of special amino resin, 10-50% of rubber latex, 1-5% of auxiliaries, and the balance of water, wherein the sum of the weight percentage of each component is 100%. A method for preparing the environment-friendly impregna-
(Continued)

tion solution includes adding blocked isocyanate and auxiliary A into water and stirring uniformly to obtain Composition 1; adding auxiliary B into Composition 1 and stirring uniformly to obtain Composition 2; adding special amino resin into Composition 2 and stirring uniformly, then subjecting the same to grinding to obtain Composition 3; adding rubber latex into Composition 3 and stirring uniformly to obtain the environment-friendly impregnation solution, followed by packaging. The impregnation solution of the invention does not contain toxic and harmful substances such as formaldehyde and resorcinol, and the preparation method thereof is simple.

6 Claims, 1 Drawing Sheet

(51) Int. Cl.
*C08L 9/10* (2006.01)
*C08L 13/02* (2006.01)
*D06M 11/72* (2006.01)
*D06M 13/188* (2006.01)
*D06M 13/395* (2006.01)
*D06M 15/53* (2006.01)
*D06M 15/693* (2006.01)
*D06M 15/423* (2006.01)

(52) U.S. Cl.
CPC ........ *D06M 13/188* (2013.01); *D06M 13/395* (2013.01); *D06M 15/53* (2013.01); *D06M 15/693* (2013.01); *C08J 2309/08* (2013.01); *C08J 2309/10* (2013.01); *C08J 2313/02* (2013.01); *C08J 2477/06* (2013.01); *C08J 2479/04* (2013.01); *C08L 9/10* (2013.01); *C08L 13/02* (2013.01); *C08L 2205/03* (2013.01); *D06M 15/423* (2013.01)

(58) Field of Classification Search
CPC .... D06M 11/72; D06M 13/395; D06M 15/53; D06M 15/693; D06M 2101/34; D06M 15/423
See application file for complete search history.

(56) References Cited

FOREIGN PATENT DOCUMENTS

| CN | 110284326 A | 9/2019 | | |
|---|---|---|---|---|
| JP | 2004027158 A | * | 1/2004 | |
| JP | 2004307623 A | * | 11/2004 | |
| WO | WO-2018182229 A1 | * | 10/2018 | ............... B05D 1/18 |

OTHER PUBLICATIONS

Machine translation of JP-2004307623-A obtained from IP.com (Year: 2004).*

International Search Report and Written Opinion issued in International Application No. PCT/CN2020/099960; mailed Sep. 28, 2020; 13 pgs.

* cited by examiner

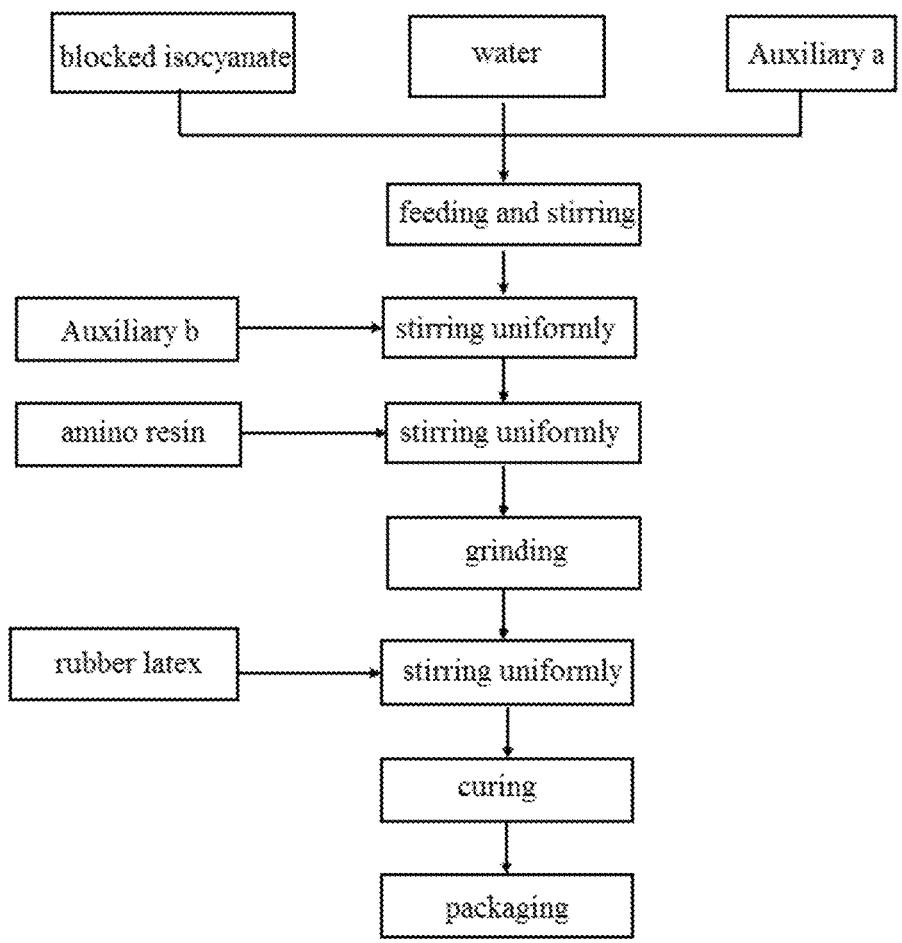

GREEN ENVIRONMENTALLY FRIENDLY ADHESIVE DIPPING LIQUID AND METHOD FOR PRODUCTION THEREOF

CROSS-REFERENCES TO RELATED APPLICATIONS

The present invention is a U.S. National Phase of International Application Number PCT/CN2020/099960 filed Jul. 2, 2020, and claims priority to Chinese patent application No. 201910607037.3 filed Jul. 6, 2019 before the China Patent Office and entitled "Environment-friendly impregnation solution and preparation method therefor".

TECHNICAL FIELD

The invention relates to the technical field of preparation of impregnation solution, and in particular, to an environment-friendly impregnation solution without formaldehyde and resorcinol, and a method for preparing the same.

BACKGROUND ART

In recent years, with the rapid development of automobile manufacturing industry and transportation industry (especially expressway), the demand for radial tyres with superior performance has increased rapidly. The radial tyres mostly take fiber fabrics, such as Chinlon, Dacron, and Aramid as framework materials, and thus there is a need for effective adhesion between rubber and the fiber fabrics such as Chinlon. In order to improve the adhesion between fibers and rubber materials, a resorcinol-formaldehyde-latex (RLF) adhesive system was invented in 1935 through research, and it has been used ever since. It is the most effective and economic adhensive system for rubber adhension to fiber as proved by time.

With the rapid economic development, the demand for rubber products and rubber framework materials is increasing. At the same time, with the awareness of environmental protection and occupational health and safety, people are paying increasing attention to chemicals such as resorcinol, formaldehyde, and the like. Countries of the world have started to reduce or even eliminate the use of harmful chemicals from the aspects of laws, regulations, industry standards, and the like.

It has been recited in *Catalogue of State-encouraged Substitutes for Toxic and Harmful Raw Materials (Products)* (2016) issued by MITT and the like, that "the phenolic resin (RLF) impregnant" has been listed as the substitute in items 6 and 7 in (II) with the subtitle "the Substitutes for Organic Pollutants". With the implementation of EU tyre labelling rules and other related laws and regulations on green tyres around the world, the greening progress of tyre raw materials has been rapidly promoted. At present, RFL (resorcinol, formaldehyde, and latex) is widely used in the adhesive system of rubber and rubber skeleton materials, and the contents of resorcinol and formaldehyde therein have been clearly limited. In addition, raw materials such as resorcinol, ammonia water in the RFL system have a stink and pungent odor, making the air of preparation workshop unpleasant; and the formaldehyde solution, as a dangerous chemical, must meet higher safety management requirements in storage and use, which improves the explosion-proof grade of the impregnation solution preparation workshop.

In various literature documents and patents, it has been reported that the impregnation solution without formaldehyde and resorcinol was used to improve the adhesive force and other application performance indicators of organic fiber materials after impregnation.

An impregnant currently used by Goodyear Company was formed by copolymerization of one or two acrylic monomers and a small amount of styrene to form acrylic resin, which was then mixed with latex to prepare the impregnant formula. When non-activated polyester fibers were used, the fibers need to be activated by epoxy compounds in a first bath and impregnated in the acrylic resin-latex system in a second bath, and the resultant performance of the framework material after impregnation is similar to that after impregnation in a traditional RFL system, and however, the overall technological process is complicated, the equipment investment is high, and the raw materials are all from specified suppliers, which is highly dependent on upstream products.

The formula, as currently claimed by a patent owned by Pirelli Tire Co., Ltd., contains at least rubber latex, epoxide, and polyamine with a molecular weight greater than 190 Dalton. In the structural elements, the adhesion between the framework material and the rubber material in these compositions is close to that of the traditional RFL system used in this industry. However, polyamine, one of the raw materials used in the formula, is demanding and high-cost, and the use thereof in the traditional preparation workshop does not meet the current environmental protection policy, and in the process of impregnation, hub sticking easily occurs, resulting in phased shutdown maintenance and other unfavorable factors, which are detrimental to continuous production.

The information disclosed in the Background section is only intended to enhance understanding of the general background of the invention and should not be taken as an acknowledgment or in any form implying that the information constitutes the prior art already known to those skilled in the art.

SUMMARY OF THE INVENTION

The invention aims to provide an environment-friendly impregnation solution and a method for preparing the same in order to solve the technical problems existing in the impregnation solutions described above. The impregnation solution of the invention does not contain toxic and harmful substances such as formaldehyde and resorcinol, and the preparation method thereof is simple, easy to operate, short in production cycle and has a high safety factor, thus ensuring that the impregnation solution preparation and impregnation process are safe and environment-friendly.

To solve the above problems, the technical solution provided by the invention is as follows: An environment-friendly impregnation solution, which comprises the following raw materials in percentage by weight: 1-15% of blocked isocyanate, 0.5-10% of special amino resin, 10-50% of rubber latex, 1-5% of auxiliaries, and the balance of water, wherein the sum of the weight percentage of each component is 100%;

the auxiliaries consist of Auxiliary a and Auxiliary b, with the mass ratio of 1:1-3.

In an embodiment of the invention, the environment-friendly impregnation solution described above comprises the following raw materials in percentage by weight: 1-5% of blocked isocyanate, 1.5-10% of special amino resin, 20-40% of rubber latex, 3-5% of auxiliaries, and the balance of water, wherein the sum of the weight percentage of each component is 100%;

the auxiliaries consist of Auxiliary a and Auxiliary b, with the mass ratio of 1:1-3.

With respect to the environment-friendly impregnation solution described above, the special amino resin is one or more of urea-formaldehyde resin, melamine-formaldehyde resin, benzoxazine resin, and polyamide polyamine epichlorohydrin.

With respect to the environment-friendly impregnation solution described above, the rubber latex is one or more of butadiene-vinylpyridine copylymer latex, butadiene latex, ethylene propylene diene monomer (EPDM), styrene-butadiene latex, natural latex, butyronitrile latex, carboxylic butadiene-vinylpyridine copylymer latex, carboxylic styrene-butadiene latex, and carboxylic butyronitrile latex.

With respect to the environment-friendly impregnation solution described above, the Auxiliary a is Tween 20, sodium diisobutyl naphthalene sulfonate, Tween 80, or fatty alcohol polyoxyethylene ether.

With respect to the environment-friendly impregnation solution described above, the Auxiliary b is a grinding aid for superfinely wet-grinding high-granularity kaolin and porcelain clay, aqueous calcium stearate emulsion, or sodium hexametaphosphate.

With respect to the environment-friendly impregnation solution described above, the impregnation solution has a solid content of 5-30%.

In addition, the invention provides a method for preparing the environment-friendly impregnation solution, which comprises the following steps:

a) firstly, weighing the respective raw materials in a ratio according to the formula of the environment-friendly impregnation solution described above;

b) adding the weighed blocked isocyanate and Auxiliary a into water and stirring uniformly to obtain Composition 1;

c) then adding Auxiliary b to the obtained Composition 1 and stirring uniformly to obtain Composition 2;

d) and adding special amino resin to the obtained Composition 2 and stirring uniformly, then grinding to obtain Composition 3;

e) adding rubber latex to the obtained Composition 3, and stirring uniformly to obtain the environment-friendly impregnation solution, followed by packaging.

With respect to the method for preparing the environment-friendly impregnation solution, the particle size distribution of solids in Composition 3 after grinding in step d) is between 1 and 50 μm.

Beneficial Effects

1. The impregnation solution of the invention functions by providing one or more forces between organic fiber materials and rubbers to make the organic fiber materials and the rubbers adhere to each other; the impregnation solution of the invention comprises blocked isocyanate, special amino resin, and the like as the main components, and has no toxic and harmful substances such as formaldehyde and resorcinol; the preparation method thereof is simple and easy to operate, short in production cycle, and has a high safety factor. Consequently, the impregnation solution preparation and impregnation processes are safe and green, without generation of waste materials, and are environment-friendly.

2. The impregnation solution of the invention is different from the existing RFL impregnation solution, and is stable in storage and transportation, thus filling a gap in the market.

BRIEF DESCRIPTION OF THE DRAWINGS

One or more examples are exemplified by the FIGURES in the accompanying drawings that correspond thereto and are not intended to be limiting of the embodiments. As used herein, the word "exemplary" means "serving as an example, embodiment, or illustrative". Any embodiment described herein as "exemplary" is not necessarily to be construed as being superior to or better than other embodiments.

FIG. 1 is a schematic diagram of the process flow of the preparation method of the environment-friendly impregnation solution of the invention.

DETAILED DESCRIPTION OF THE INVENTION

In order to make the purpose, technical solutions and advantages of the embodiments of the invention clearer, the technical solutions in the embodiments of the invention will be clearly and completely illustrated with reference to one or more embodiments and corresponding drawings.

Obviously, the described embodiments are some of the embodiments of the present invention, but not all of them. Based on the embodiments of the present invention, all other embodiments obtained by those of ordinary skill in the art without creative work are within the scope of the present invention. Throughout the specification and claims, the term "comprising" or variations thereof, such as "including" or "containing" and the like, will be understood to include the stated components and not to exclude other elements or other components, unless expressly indicated otherwise.

These embodiments are not intended to limit the scope of protection. Unless otherwise stated, any embodiment herein is not necessarily to be construed as being superior to or better than other embodiments.

In addition, in order to better explain the present invention, a lot of specific details are given in the following embodiments. It will be understood by those skilled in the art that the present invention may be practiced without certain specific details. In some embodiments, methods, means, elements well known to those skilled in the art, experimental methods generally according to conventional conditions and according to the conditions described in the manual or according to the conditions suggested by the manufacturer are not described in detail so as to highlight the spirit of the present invention. The materials and reagents used are conventionally commercially available, unless otherwise specified.

In the following examples, the raw materials used were all commercial available, in which:

blocked isocyanate, with a viscosity of 200-500 mpa·s/25° C., a solid content of 50±1.5%, a density of 1.0±0.2 g/cm$^3$ (20° C.), and a particle size of ≤5 μm;

Bisphenol A/aniline benzoxazine resin, with a molecular weight of 466-800, a softening point of 50-90° C., and gel time (210° C., 1 g) of 100-400 seconds;

Phenol/MDA benzoxazine resin, with a molecular weight of 438-800, a softening point of 50-90° C., and gel time (210° C., 1 g) of 100-400 seconds;

Bisphenol F/aniline benzoxazine resin, with a molecular weight of 438-800, a softening point of 50-90° C., and gel time (210° C., 1 g) of 100-400 seconds;

Butadiene-vinylpyridine copylymer latex, with a viscosity of 20-45 mpa·s/25° C., a solid content of 39.5-41.5%, a density of 0.980-0.990 g/cm$^3$ (20° C.), and pH 10-12;

Carboxylic styrene-butadiene latex, with a viscosity of 4-350 mpa·s/25° C., a solid content of 48.0-54.0%, a density of 0.970-0.100 g/cm$^3$ (20° C.), and pH 7.0-9.0;

Styrene-butadiene latex, with a viscosity of 200-800 mpa·s/25° C., a solid content of 48.0-61.0%, a density of 0.960-0.980 g/cm$^3$ (20° C.), and pH 8.0-10.5;

Butadiene latex, with a viscosity of 10-50 mpa·s/25° C., a solid content of 48.0-54.0%, a density of 1.01-1.20 g/cm$^3$ (20° C.), and pH 12.0-14.0;

Butyronitrile latex, with a viscosity of 7-50 mpa·s/25° C., a solid content of 43.0-45.0%, and pH 7.0-8.0;

Carboxylic styrene-butadiene latex, with a viscosity of 4-350 mpa·s/25° C., a solid content of 48.0-54.0%, a density of 0.970-0.100 g/cm$^3$ (20° C.), and pH 7.0-9.0.

Example 1

The environment-friendly impregnation solution of the invention, in percentage by weight, consisted of the following raw materials: 150 kg blocked isocyanate, 5 kg benzoxazine resin, 100 kg butadiene-vinylpyridine copolymer latex, 15 kg Auxiliary a (fatty alcohol polyoxyethylene ether), 25 kg Auxiliary b (sodium hexametaphosphate), and 705 kg demineralized water, wherein the total weight of the respective components was 1000 kg; the solid content of the obtained impregnation solution was 15.0%.

In this example, the benzoxazine resin was bisphenol A/aniline benzoxazine resin having the bisphenol A/aniline bicyclic structure.

Example 2

The environment-friendly impregnation solution of the invention, in percentage by weight, consisted of the following raw materials: 100 kg blocked isocyanate, 15 kg benzoxazine resin, 300 kg carboxylic styrene-butadiene latex, 15 kg Auxiliary a (fatty alcohol polyoxyethylene ether), 25 kg Auxiliary b (sodium hexametaphosphate), and 545 kg demineralized water, wherein the total weight of the respective components was 1000 kg; the solid content of the obtained impregnation solution was 24%.

In this example, the benzoxazine resin was phenol/MDA benzoxazine resin having the phenol/MDA bicyclic structure.

Example 3

The environment-friendly impregnation solution of the invention, in percentage by weight, consisted of the following raw materials: 50 kg blocked isocyanate, 15 kg benzoxazine resin, 300 kg butadiene-vinylpyridine copolymer latex, 15 kg Auxiliary a (fatty alcohol polyoxyethylene ether), 25 kg Auxiliary b (sodium hexametaphosphate), and 595 kg demineralized water, wherein the total weight of the respective components was 1000 kg; the solid content of the obtained impregnation solution was 18.0%.

In this example, the benzoxazine resin was bisphenol F/aniline benzoxazine resin having the bisphenol F/MDA bicyclic structure.

Example 4

The environment-friendly impregnation solution of the invention, in percentage by weight, consisted of the following raw materials: 50 kg blocked isocyanate, 60 kg benzoxazine resin, 500 kg carboxylic styrene-butadiene latex, 15 kg Auxiliary a (fatty alcohol polyoxyethylene ether), 25 kg Auxiliary b (sodium hexametaphosphate), and 350 kg demineralized water, wherein the total weight of the respective components was 1000 kg; the solid content of the obtained impregnation solution was 35.5%.

In this example, the benzoxazine resin was bisphenol F/aniline benzoxazine resin having the bisphenol F/MDA bicyclic structure.

Example 5

The environment-friendly impregnation solution of the invention, in percentage by weight, consisted of the following raw materials: 10 kg blocked isocyanate, 100 kg benzoxazine resin, 300 kg carboxylic styrene-butadiene latex, 15 kg Auxiliary a (fatty alcohol polyoxyethylene ether), 25 kg Auxiliary b (sodium hexametaphosphate), and 550 kg demineralized water, wherein the total weight of the respective components was 1000 kg; the solid content of the obtained impregnation solution was 30%.

In this example, the benzoxazine resin was bisphenol A/aniline benzoxazine resin having the bisphenol A/aniline bicyclic structure.

Example 6

The environment-friendly impregnation solution of the invention, in percentage by weight, consisted of the following raw materials: 150 kg blocked isocyanate, 5 kg benzoxazine resin, 100 kg EPDM, 15 kg Auxiliary a (fatty alcohol polyoxyethylene ether), 25 kg Auxiliary b (sodium hexametaphosphate), and 705 kg demineralized water, wherein the total weight of the respective components was 1000 kg; the solid content of the obtained impregnation solution was 15.0%.

In this example, the benzoxazine resin was bisphenol A/aniline benzoxazine resin having the bisphenol A/aniline bicyclic structure.

Example 7

The environment-friendly impregnation solution of the invention, in percentage by weight, consisted of the following raw materials: 100 kg blocked isocyanate, 15 kg benzoxazine resin, 300 kg EPDM, 15 kg Auxiliary a (fatty alcohol polyoxyethylene ether), 25 kg Auxiliary b (sodium hexametaphosphate), and 545 kg demineralized water, wherein the total weight of the respective components was 1000 kg; the solid content of the obtained impregnation solution was 24%.

In this example, the benzoxazine resin was bisphenol A/aniline benzoxazine resin having the bisphenol A/aniline bicyclic structure.

Example 8

The environment-friendly impregnation solution of the invention, in percentage by weight, consisted of the following raw materials: 50 kg blocked isocyanate, 15 kg benzoxazine resin, 300 kg EPDM, 15 kg Auxiliary a (fatty alcohol polyoxyethylene ether), 25 kg Auxiliary b (sodium hexametaphosphate), and 595 kg demineralized water, wherein the total weight of the respective components was 1000 kg; the solid content of the obtained impregnation solution was 21%.

In this example, the benzoxazine resin was bisphenol A/aniline benzoxazine resin having the bisphenol A/aniline bicyclic structure.

Example 9

The environment-friendly impregnation solution of the invention, in percentage by weight, consisted of the following raw materials: 50 kg blocked isocyanate, 60 kg benzoxazine resin, 500 kg butadiene-vinylpyridine copylymer latex, 15 kg Auxiliary a (fatty alcohol polyoxyethylene ether), 25 kg Auxiliary b (sodium hexametaphosphate), and 350 kg demineralized water, wherein the total weight of the respective components was 1000 kg; the solid content of the obtained impregnation solution was 31%.

In this example, the benzoxazine resin was phenol/MDA benzoxazine resin having the phenol/MDA bicyclic structure.

Example 10

The environment-friendly impregnation solution of the invention, in percentage by weight, consisted of the following raw materials: 10 kg blocked isocyanate, 100 kg benzoxazine resin, 300 kg styrene-butadiene latex, 15 kg Auxiliary a (fatty alcohol polyoxyethylene ether), 25 kg Auxiliary b (aqueous calcium stearate emulsion), and 550 kg demineralized water, wherein the total weight of the respective components was 1000 kg; the solid content of the obtained impregnation solution was 30%.

In this example, the benzoxazine resin was bisphenol A/aniline benzoxazine resin having the bisphenol A/aniline bicyclic structure.

Example 11

The environment-friendly impregnation solution of the invention, in percentage by weight, consisted of the following raw materials: 150 kg blocked isocyanate, 5 kg benzoxazine resin, 100 kg butadiene latex, 15 kg Auxiliary a (Tween 20), 25 kg Auxiliary b (sodium hexametaphosphate), and 705 kg demineralized water, wherein the total weight of the respective components was 1000 kg; the solid content of the obtained impregnation solution was 15.0%.

In this example, the benzoxazine resin was bisphenol A/aniline benzoxazine resin having the bisphenol A/aniline bicyclic structure.

Example 12

The environment-friendly impregnation solution of the invention, in percentage by weight, consisted of the following raw materials: 100 kg blocked isocyanate, 15 kg benzoxazine resin, 300 kg butadiene latex, 15 kg Auxiliary A (Tween 80), 25 kg Auxiliary B (sodium hexametaphosphate), and 545 kg demineralized water, wherein the total weight of the respective components was 1000 kg; the solid content of the obtained impregnation solution was 24%.

In this example, the benzoxazine resin was phenol/MDA benzoxazine resin having the phenol/MDA bicyclic structure.

Example 13

The environment-friendly impregnation solution of the invention, in percentage by weight, consisted of the following raw materials: 50 kg blocked isocyanate, 15 kg benzoxazine resin, 300 kg butadiene-vinylpyridine copylymer latex, 15 kg Auxiliary a (sodium diisobutyl naphthalene sulfonate), 25 kg Auxiliary b (aqueous calcium stearate emulsion), and 595 kg demineralized water, wherein the total weight of the respective components was 1000 kg; the solid content of the obtained impregnation solution was 18.0%.

In this example, the benzoxazine resin was bisphenol F/aniline benzoxazine resin having the bisphenol F/MDA bicyclic structure.

Example 14

The environment-friendly impregnation solution of the invention, in percentage by weight, consisted of the following raw materials: 50 kg blocked isocyanate, 60 kg benzoxazine resin, 500 kg butyronitrile latex, 15 kg Auxiliary a (Tween 20), 25 kg Auxiliary b (sodium hexametaphosphate), and 350 kg demineralized water, wherein the total weight of the respective components was 1000 kg; the solid content of the obtained impregnation solution was 35%.

In this example, the benzoxazine resin was bisphenol F/aniline benzoxazine resin having the bisphenol F/MDA bicyclic structure.

Example 15

The environment-friendly impregnation solution of the invention, in percentage by weight, consisted of the following raw materials: 10 kg blocked isocyanate, 100 kg benzoxazine resin, 300 kg carboxylic styrene-butadiene latex, 15 kg Auxiliary a (Tween 80), 25 kg Auxiliary b (sodium hexametaphosphate), and 550 kg demineralized water, wherein the total weight of the respective components was 1000 kg; the solid content of the obtained impregnation solution was 30%.

In this example, the benzoxazine resin was bisphenol A/aniline benzoxazine resin having the bisphenol A/aniline bicyclic structure.

The environment-friendly impregnation solutions of the invention in Examples 1-15 were prepared as follows:
  a) firstly, weighing the respective raw materials in a ratio according to the formula of the environment-friendly impregnation solution described in any one of Examples 1-15;
  b) adding the weighed blocked isocyanate and Auxiliary a into demineralized water and stirring uniformly to obtain Composition 1;
  c) then adding Auxiliary b to the obtained Composition 1 and stirring uniformly to obtain Composition 2;
  d) and adding special amino resin to the obtained Composition 2 and stirring uniformly, then grinding to obtain Composition 3 with a solid particle size less than 5 μm;
  e) adding rubber latex to the obtained Composition 3, and stirring uniformly to obtain the environment-friendly impregnation solution, followed by packaging.

The comparison in the related properties between the environment-friendly impregnation solution of the invention obtained from any of Examples 1-15 and the existing traditional products was as follows:

Description of the impregnation method and materials in the examples: Examples 1-15 of the invention all adopted one-bath impregnation method. In order to ensure the consistency and comparability of the experimental data, in the existing product 1 used as a control sample, Dacron was used as the fiber framework material, which was completely the same as that in Examples 1-5 of the invention, and the impregnation solution was RFL system; in the existing product 2, Chinlon 66 was used as the fiber framework material, which was completely the same as that in Examples 6-10 of the invention, and the impregnation solution was RFL system; in the existing product 3, Chinlon 6 was used as the fiber framework material, which was completely the same as that in Examples 11-15 of the invention, and the impregnation solution was RFL system. Description of the test method of samples from the Examples: the cords impregnated with the impregnation solution of any of Examples 1-15 of the invention or with the existing products 1-3 were tested as follows: the dip pick-up was determined by dissolving the impregnated cord fabrics with a specific solvent according to GB/T30310-2013 method, and measuring the remaining solid amount; H adhesive force was determined by measuring the force required for pulling out single cord from a vulcanized rubber block according to GB/T2942-2009 method; the peel adhesion from surface was determined by peeling off the sample die blank made of impregnated cord fabrics and rubber at a constant speed by a tensile testing machine according to GB/T32109-2015 method, and the middle peak value of peeling force was the adhesive peeling strength; tensile properties were determined by, under specified conditions, fixing the impregnated cord on a CRE tensile machine, and applying a tensile force at a constant speed until the cord broken according to GB/T32108-2015 method; a dry heat shrinkage was determined by measuring the shrinkage of impregnated cord fabrics over a period of time under hot air at a constant temperature according to GB/T30312-2013 method.

The formulas and test results of the impregnation solutions of Examples 1-5 of the invention and the existing product 1 were shown in Table 1.

TABLE 1

Formulas and test results of the Impregnation solutions of Examples 1-5 and the existing product 1

| Item | | Example 1 | Example 2 | Example 3 | Example 4 | Example 5 | Existing product 1 | Gb reference value |
|---|---|---|---|---|---|---|---|---|
| Fiber | | Dacron (1440 dtex/2) | Dacron (1440 dtex/2) | Dacron (1440 dtex/2) | Dacron (1440 dtex/2) | Dacron (1440 dtex/2) | Dacron (1440 dtex/2) | Chinion 66 (1400 dtex/2) |
| Impregnation solution formula | Demineralized water | 70.5% | 54.5% | 59.5% | 35% | 54% | RFL (resorcinol-formaldehyde-latex system) | |
| | Blocked isocyanate | 15% | 10% | 5% | 5% | 1% | | |
| | Special amino resin | 0.5% | 1.5% | 1.5% | 6.0% | 10% | | |
| | Rubber latex | 10% | 30% | 30% | 50% | 30% | | |
| | Auxiliary a | 1.5% | 1.5% | 1.5% | 1.5% | 1.5% | | |
| | Auxiliary b | 2.5% | 2.5% | 2.5% | 2.5% | 2.5% | | |
| Solid content % | | 15% | 24% | 18% | 35.5% | 30% | | |
| Dip pick-up/% | | 4.6 | 4.8 | 5.1 | 5.1 | 5.0 | 5.0 | 5.0 ± 1.0 |
| H adhesive force (N/1.0 cm) | | 137.2 | 142.4 | 146.3 | 147.5 | 147.2 | 147.1 | High-class: 147.0 First-class: 137.2 Qualified: 127.4 |
| Adhesive peeling properties | | | | | | | | |
| Tensile properties test: | Breaking strength/N≥ | 201.7 | 209.4 | 215.4 | 216.8 | 217.2 | 215.9 | High-class: 215.6 First-class: 211.7 Qualified: 205.8 |
| | Elongation at break/%≥ | 18.7 | 19.0 | 19.2 | 19.2 | 19.3 | 19.1 | 19.0 |
| | Constant-load elongation/% 66.6N | 8.2 | 8.5 | 8.7 | 8.7 | 8.7 | 8.5 | High-class: 9.0 ± 0.6 First-class: 9.0 ± 0.8 Qualified: 9.0 ± 1.0 |
| | Variation coefficient of breaking strength/%≤ | 4.4 | 4.2 | 3.8 | 3.7 | 3.8 | 3.8 | High-class: 3.8 First-class: 4.8 Qualified: 5.8 |
| | Variation coefficient of elongation at break/%≤ | 6.5 | 6.3 | 6.2 | 6.3 | 6.3 | 6.2 | High-class: 6.3 First-class: 7.3 Qualified: 8.3 |
| Dry heat shrinkage/%< | | 5.1 | 5.0 | 5.0 | 4.9 | 5.0 | 5.0 | 5.0 |

The formulas and test results of the impregnation solutions of Examples 6-10 of the invention and the existing product 2 were shown in Table 2.

TABLE 2

Formulas and test results of the impregnation solutions of Examples 6-10 of the invention and the existing product 2

| Item | | Example 6 | Example 7 | Example 8 | Example 9 | Example 10 | Existing product 2 | Gb reference value |
|---|---|---|---|---|---|---|---|---|
| Fiber | | Chinlon 66 (1400 dtex/2) | Chinion 66 (1400 dtex/2) | Chinion 66 (1400 dtex/2) | Chinion 66 (1400 dtex/2) | Chinion 66 (1400 dtex/2) | Chinion 66 (1400 dtex/2) | Chinion 66 (1400 dtex/2) |
| Impregnation solution formula | Demineralized water | 70.5% | 54.5% | 59.5% | 35% | 54% | RFL (resorcinol-formaldehyde-latex system) | |
| | Blocked isocyanate | 15% | 10% | 5% | 5% | 1% | | |
| | Special amino resin | 0.5% | 1.5% | 1.5% | 6.0% | 10% | | |
| | Rubber latex | 10% | 30% | 30% | 50% | 30% | | |
| | Auxiliary a | 1.5% | 1.5% | 1.5% | 1.5% | 1.5% | | |
| | Auxiliary b | 2.5% | 2.5% | 2.5% | 2.5% | 2.5% | | |
| Solid content/% | | 15% | 24% | 21% | 31% | 30% | | |
| Dip pick-up/% | | 4.8 | 5.0 | 5.1 | 5.0 | 5.0 | 5.0 | 5.0 ± 1.0 |
| H adhesive force (N/1.0 cm) | | 135 | 139 | 145 | 150 | 148 | 146 | High-class: 147.0 First-class: 137.2 Qualified: 127.4 |
| Adhesive peeling properties | | | | | | | | |
| Tensile properties test: | Breaking strength/N≥ | 185.7 | 199.2 | 217.0 | 219.4 | 216.3 | 216.1 | High-class: 215.6 First-class : 211.7 Qualified: 205.8 |
| | Elongation at break/%≥ | 17.7 | 19.2 | 19.6 | 19.9 | 19.4 | 19.1 | 19.0 |
| | Constant-load elongation/% 66.6N | 8.2 | 9.0 | 8.9 | 8.5 | 9.2 | 9.0 | High-class: 9.0 ± 0.6 First-class: 9.0 ± 0.8 Qualified: 9.0 ± 1.0 |
| | Variation coefficient of breaking strength/%≤ | 3.8 | 4.3 | 3.7 | 3.9 | 3.6 | 3.8 | High-class: 3.8 First-class : 4.8 Qualified: 5.8 |
| | Variation coefficient of elongation at break/%≤ | 6.2 | 6.4 | 6.4 | 6.1 | 6.0 | 6.2 | High-class: 6.3 First-class: 7.3 Qualified: 8.3 |
| Dry heat shrinkage/% < 150° C./30 min | | 5.0 | 5.0 | 4.9 | 5.0 | 4.8 | 5.0 | 5.0 |

The formulas and test results of the impregnation solutions of Examples 11-15 of the invention and the existing product 3 were shown in Table 3.

TABLE 3

Formulas and test results of the impregnation solutions of Examples 11-15 of the invention and the existing product 3

| Item | | Example 11 | Example 12 | Example 13 | Example 14 | Example 15 | Existing product 3 | Gb reference value |
|---|---|---|---|---|---|---|---|---|
| Fiber | | Chinion 6 (1400 dtex/2) | Chinion 6 (1400 dtex/2) | Chinion 6 (1400 dtex/2) | Chinion 6 (1400 dtex/2) | Chinion 6 (1400 dtex/2) | Chinion 6 (1400 dtex/2) | Chinion 6 (1400 dtex/2) |
| Impregnation solution formula | Demineralized water | 70.5% | 54.5% | 59.5% | 35% | 54% | RFL (resorcinol-formaldehyde- | |
| | Blocked | 15% | 10% | 5% | 5% | 1% | | |

TABLE 3-continued

Formulas and test results of the impregnation solutions of Examples 11-15 of the invention and the existing product 3

| Item | | Example 11 | Example 12 | Example 13 | Example 14 | Example 15 | Existing product 3 | Gb reference value |
|---|---|---|---|---|---|---|---|---|
| | isocyanate | | | | | | latex | |
| | Special amino resin | 0.5% | 1.5% | 1.5% | 6.0% | 10% | system) | |
| | Rubber latex | 10% | 30% | 30% | 50% | 30% | | |
| | Auxiliary a | 1.5% | 1.5% | 1.5% | 1.5% | 1.5% | | |
| | Auxiliary b | 2.5% | 2.5% | 2.5% | 2.5% | 2.5% | | |
| Solid content % | | 15% | 24% | 18% | 35% | 30% | | |
| Dip pick-up/% | | 3.7 | 4.1 | 4.0 | 4.3 | 4.3 | 4.1 | High-class: 4.2 ± 1.0 First-class: 4.2 ± 1.2 Qualified: 4.2 ± 1.2 |
| H adhesive force (N/1.0 cm) | | 62 | 63 | 67 | 71 | 70 | 70 | High-class: 70 First-class: 65 Qualified: 60 |
| Adhesive peeling properties | | | | | | | | |
| Tensile properties test: | Breaking strength/N> | 92 | 99 | 105 | 109 | 110 | 108 | High-class: 107 First-class: 102 Qualified: 97 |
| | Elongation at break/%≥ Constant-load elongation/% 33.0N | 8.3 | 8.6 | 8.6 | 8.4 | 8.4 | 8.3 | High-class: 8.0 ± 0.8 First-class: 8.0 ± 1.0 Qualified: 8.0 ± 1.0 |
| | Variation coefficient of breaking strength/%< | 5.5 | 5.2 | 5.2 | 5.0 | 5.0 | 5.0 | High-class: 5.0 First-class: 6.0 Qualified: 6.5 |
| | Variation coefficient of elongation at break/%≤ | | | | | | | |
| Dry heat shrinkage/%< | | 4.7 | 4.5 | 4.5 | 4.4 | 4.4 | 4.4 | 4.5 |

The results in Table 1-3 showed that the impregnation solution of the invention without resorcinol, formaldehyde, and the like showed a good adhesive effect between Dacron cord and rubber, achieving the same adhesive level as the traditional RFL, and can completely substitute the RFL impregnation solution.

Finally, it should be noted that the above examples are only used to illustrate the technical solutions of the present invention but not to limit the same; although the present invention has been described in detail with reference to the foregoing examples, those skilled in the art would understand that the technical solutions described in the foregoing examples can still be modified or some technical features can be equivalently substituted, and these modifications or substitutions do not make the essence of the corresponding technical solutions departing from the spirit and scope of the technical solutions of various embodiments of the present invention.

INDUSTRIAL APPLICABILITY

The invention provides an environment-friendly impregnation solution and a method for preparing the same. The environment-friendly impregnation solution comprises the following raw materials in percentage by weight: 1-15% of blocked isocyanate, 0.5-10% of special amino resin, 10-50% of rubber latex, 1-5% of auxiliaries, and the balance of water, wherein the sum of the weight percentage of each component is 100%. The impregnation solution of the invention does not contain toxic and harmful substances such as formaldehyde and resorcinol, and the preparation method thereof is simple, easy to operate, short in production cycle, and has a high safety factor, thus ensuring the impregnation solution preparation and impregnation processes are safe and environment-friendly.

The invention claimed is:
1. An environment-friendly impregnation solution, wherein, the environment-friendly impregnation solution consists of the following raw materials in percentage by weight: 1-15% of blocked isocyanate, 0.5-10% of spe- cial amino resin, 10-50% of rubber latex, 1-5% of auxiliaries, and the balance of water, wherein the sum of the weight percentage of each component is 100%;

the auxiliaries consist of Auxiliary a and Auxiliary b, with the mass ratio of 1:1-3, the special amino resin is one or more of benzoxazine resin, and polyamide polyamine epichlorohydrin;

the Auxiliary a is polyethylene glycol sorbitan monolaurate, sodium diisobutyl naphthalene sulfonate, polyethylene glycol sorbitan monooleate, or fatty alcohol polyoxyethylene ether; and the Auxiliary b is a grinding aid for superfinely wet-grinding high-granularity kaolin and porcelain clay, aqueous calcium stearate emulsion, or sodium hexametaphosphate.

2. The environment-friendly impregnation solution according to claim 1, wherein, the environment-friendly impregnation solution consists of the following raw materials in percentage by weight: 1-5% of blocked isocyanate, 1.5-10% of special amino resin, 20-40% of rubber latex, 3-5% of auxiliaries, and the balance of water, wherein the sum of the weight percentage of each component is 100%;

the auxiliaries consist of auxiliary a and auxiliary b, with the mass ratio of 1:1-3.

3. The environment-friendly impregnation solution according to claim 1, wherein, the rubber latex is one or more of butadiene-vinylpyridine copolymer latex, butadiene latex, ethylene propylene diene monomer (EPDM), styrene-butadiene latex, natural latex, butyronitrile latex, carboxylic butadiene-vinylpyridine copolymer latex, carboxylic styrene-butadiene latex, and carboxylic butyronitrile latex.

4. The environment-friendly impregnation solution according to claim 1, wherein, the solid content of the environment-friendly impregnation solution is 5-30%.

5. A method for preparing the environment-friendly impregnation solution according to claim 1, wherein, the method comprises the following steps:

a) firstly, weighing the respective raw materials in a ratio according to the formula of the environment-friendly impregnation solution;

b) adding the weighed blocked isocyanate and Auxiliary a into water and stirring uniformly to obtain Composition 1;

c) then adding Auxiliary b to the obtained Composition 1 and stirring uniformly to obtain Composition 2;

d) and adding special amino resin to the obtained Composition 2 and stirring uniformly, then grinding to obtain Composition 3;

e) adding rubber latex to the obtained Composition 3, and stirring uniformly to obtain the environment-friendly impregnation solution, followed by packaging.

6. The method for preparing the environment-friendly impregnation solution according to claim 5, wherein, the particle size distribution of solids in Composition 3 after the grinding in step d) is between 1 and 50 μm.

\* \* \* \* \*